UNITED STATES PATENT OFFICE.

WILLIAM HENRY DOW, OF BURLINGTON, VERMONT.

GRAINING COMPOUND.

SPECIFICATION forming part of Letters Patent No. 300,350, dated June 17, 1884.

Application filed December 29, 1883. (No specimens.)

*To all whom it may concern:*

Be it known that I, WM. H. DOW, a citizen of the United States, residing at Burlington, in the county of Chittenden and State of Vermont, have invented a new and useful Compound, of which the following is a specification.

My invention relates to a composition for staining wood preparatory to the graining thereof; and it has for its object to provide a composition of this character which shall possess quick drying qualities, enabling the varnish to be applied immediately after the application of the composition, and also to provide a composition for this purpose which shall be comparatively inexpensive in comparison with the graining compositions in common use.

The ingredients composing my composition are as follows: whiting, thirteen ounces; wheat flour, two and one-half ounces; burnt umber, one-half ounce.

The above proportions are suitable for ash or chestnut. For imitating maple, raw senna should be substituted for the umber and in about the same proportion. For darker woods, the proportion of umber may be increased to produce the desired color.

The above ingredients should be thoroughly mixed with about two quarts of vinegar or stale beer, and is then ready for application.

By the use of the above-described mixture the varnish may be applied immediately after the graining has been finished, thus avoiding tedious delays in waiting for the drying of the compositions which are in general use.

Having fully described my invention, what I claim as new, and desire to secure by Letters Patent, is—

The herein-described graining composition, consisting of whiting, wheat flour, and burnt umber, mixed with vinegar or beer, in about the proportions specified.

In testimony that I claim the foregoing as my own I have hereto affixed my signature in presence of two witnesses.

WILLIAM HENRY DOW.

Witnesses:
  WM. H. ROOT,
  E. D. NASH.